US010797878B2

(12) United States Patent
Cleaver et al.

(10) Patent No.: US 10,797,878 B2
(45) Date of Patent: Oct. 6, 2020

(54) MULTI-NODE TRANSACTION MANAGEMENT USING ONE-TIME TOKENS

(71) Applicant: International Business Machines Corporation, Armonk, NY (US)

(72) Inventors: James D. Cleaver, Grose Wold (AU); Louise A. McGuire, Beaumont Hills (AU); Mike McGuire, Beaumont Hills (AU)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 15/826,265

(22) Filed: Nov. 29, 2017

(65) Prior Publication Data

US 2019/0165945 A1  May 30, 2019

(51) Int. Cl.
*H04L 9/32* (2006.01)
*H04L 29/08* (2006.01)
*H04L 9/06* (2006.01)
*G06Q 20/38* (2012.01)
*G06Q 20/06* (2012.01)
*G06Q 30/02* (2012.01)

(52) U.S. Cl.
CPC ......... *H04L 9/3228* (2013.01); *G06Q 20/065* (2013.01); *G06Q 20/385* (2013.01); *G06Q 20/3821* (2013.01); *H04L 9/0637* (2013.01); *H04L 9/3213* (2013.01); *H04L 9/3239* (2013.01); *H04L 9/3297* (2013.01); *H04L 67/146* (2013.01); *G06Q 30/0248* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| 6,908,030 | B2 | 6/2005 | Rajasekaran et al. |
| 7,568,631 | B2 | 8/2009 | Gibbs et al. |
| 2001/0056409 | A1 | 12/2001 | Bellovin et al. |
| 2007/0114274 | A1 | 5/2007 | Gibbs et al. |

(Continued)

FOREIGN PATENT DOCUMENTS

WO    2017009636 A2    1/2017

OTHER PUBLICATIONS

Aasen, Rick et al.; "Software Requirements Specification"; SplitPay; Version 1.0; Zildor, Inc.; Feb. 9, 2011; pp. 42.

*Primary Examiner* — Kambiz Zand
*Assistant Examiner* — Arezoo Sherkat
(74) *Attorney, Agent, or Firm* — Robert J. Shatto

(57) ABSTRACT

A system, method and program product for implementing a multi-node transaction management system. A system is disclosed that includes a one-time token generator that generates a one-time token in response to a request for a multi-node transaction with a resource provider for a group of client nodes; a sub-transaction manager that collects tokens from each client node involved in the multi-node transaction, wherein at least one of the tokens is utilized to fully secure the one-time token; a trust manager that ensures that each client node meets an allocated obligation of the multi-node transaction; and a provider interface that forwards the one-time token to the resource provider to complete the multi-node transaction.

17 Claims, 2 Drawing Sheets

(56) References Cited

U.S. PATENT DOCUMENTS

| | | |
|---|---|---|
| 2011/0313871 A1 | 12/2011 | Greenwood |
| 2012/0166332 A1 | 6/2012 | Naaman |
| 2012/0254041 A1 | 10/2012 | Saxena et al. |
| 2013/0047202 A1* | 2/2013 | Radhakrishnan ....... G06F 21/32 726/1 |
| 2014/0156517 A1 | 6/2014 | Argue et al. |
| 2014/0164234 A1 | 6/2014 | Coffman et al. |
| 2014/0279098 A1 | 9/2014 | Ham |
| 2015/0339318 A1* | 11/2015 | O'Toole ................. G06Q 20/29 705/40 |
| 2016/0071094 A1* | 3/2016 | Krishnaiah .......... G06Q 20/363 705/66 |
| 2016/0103635 A1 | 4/2016 | Sugiyama et al. |
| 2017/0017958 A1* | 1/2017 | Scott ..................... G06Q 20/40 |
| 2017/0330181 A1* | 11/2017 | Ortiz ................... G06Q 20/023 |
| 2018/0041487 A1* | 2/2018 | Wang ................. H04L 61/6059 |
| 2018/0173906 A1* | 6/2018 | Rodriguez ......... G06K 7/10297 |
| 2018/0176017 A1* | 6/2018 | Rodriguez ............. H04L 63/08 |
| 2018/0181964 A1* | 6/2018 | Zagarese .......... G06Q 20/40145 |
| 2018/0189781 A1* | 7/2018 | McCann ............. G06Q 20/382 |
| 2018/0225649 A1* | 8/2018 | Babar ................. G06Q 20/227 |
| 2018/0253727 A1* | 9/2018 | Ortiz ................... G06Q 20/405 |
| 2018/0287893 A1* | 10/2018 | O'Brien ............. H04L 41/5048 |
| 2019/0036906 A1* | 1/2019 | Biyani ............... H04L 63/0807 |
| 2019/0081784 A1* | 3/2019 | Carey ................... G06Q 20/06 |
| 2019/0279181 A1* | 9/2019 | Kelly .................... G06Q 20/12 |

* cited by examiner

MULTI-NODE TRANSACTION MANAGEMENT USING ONE-TIME TOKENS

TECHNICAL FIELD

The subject matter of this invention relates to multi-node transactions and more particularly to a multi-node transaction management system and method that utilizes a one-time token acceptable by resource providers.

BACKGROUND

Large resource providers, such as cloud infrastructures, network infrastructures, IoT (Internet of Things) platforms, autonomous platforms, banking infrastructures, etc., often have large numbers of client nodes that utilize services and resources of the provider. In these settings, a resource is provided to the client node in exchange for some consideration that is realized with a separate transaction. Transactions involving client nodes are typically realized with tokens that are delivered from the client node to the resource provider. Thus, when a client node uses a resource of the provider, a token associated with the client node is provided to complete the transaction.

Complications however can arise when multiple client nodes share a resource and want to split the transaction amongst the set of nodes (referred to herein as a multi-node transaction). For example, in an IoT setting, a set of disparate devices may join together to obtain storage from a cloud provider that can be shared among the devices. Often, such providers are not equipped to process transactions when multiple nodes are involved. One such reason is that associating a single transaction to multiple client nodes may add significant overhead to the system, e.g., for a transaction involving n client nodes, n sub-transactions must be managed and processed. Further, the resource provider must be equipped to handle different allocations, e.g., should the transaction be allocated equally, based on a rule, based on input from the client nodes, etc. Moreover, if there is a discrepancy involving the transaction, who is responsible to resolve the discrepancy? Accordingly, many such resource providers are not implemented to process single transactions involving multiple client nodes, and instead leave the burden to the client nodes to settle up among themselves. Client nodes however lack automated processes that can effectively implement sub-transactions amongst the nodes.

SUMMARY

Aspects of the disclosure provide a multi-node transaction management platform that is able to generate a one-time token that can be accepted by the resource provider for a transaction involving multiple client nodes. The solution also manages sub-transactions among the client nodes to ensure each client node pays a required allocation. Accordingly, the solution provides a technical improvement to resource provisioning systems that are incapable of handling multi-node transactions.

A first aspect discloses a multi-node transaction management system, including: a one-time token generator that generates a one-time token in response to a request for a multi-node transaction with a resource provider for a group of client nodes; a sub-transaction manager that collects tokens from each client node involved in the multi-node transaction, wherein at least one of the tokens is utilized to fully secure the one-time token; a trust manager that ensures that each client node meets an allocated obligation of the multi-node transaction; and a provider interface that forwards the one-time token to the resource provider to complete the multi-node transaction.

A second aspect discloses a method of providing multi-node transaction management, including: receiving a request for a multi-node transaction with a resource provider for a group of client nodes; generating a one-time token in response to request; collecting tokens from each client node involved in the multi-node transaction, wherein at least one of the tokens is utilized to fully secure the one-time token; providing a trust manager that ensures that each client node meets an allocated obligation of the multi-node transaction; and forwarding the one-time token to the resource provider to complete the multi-node transaction.

A third aspect discloses a computer program product stored on a computer readable storage medium, which when executed by a computing system, provides multi-node transaction management, the program product including: program code that receives a request for a multi-node transaction with a resource provider for a group of client nodes; program code for generating a one-time token in response to request; program code for collecting tokens from each client node involved in the multi-node transaction, wherein at least one of the tokens is utilized to fully secure the one-time token; program code for providing a trust manager that ensures that each client node meets an allocated obligation of the multi-node transaction; and program code for forwarding the one-time token to the resource provider to complete the multi-node transaction.

BRIEF DESCRIPTION OF THE DRAWINGS

These and other features of this invention will be more readily understood from the following detailed description of the various aspects of the invention taken in conjunction with the accompanying drawings in which.

Figure 1:
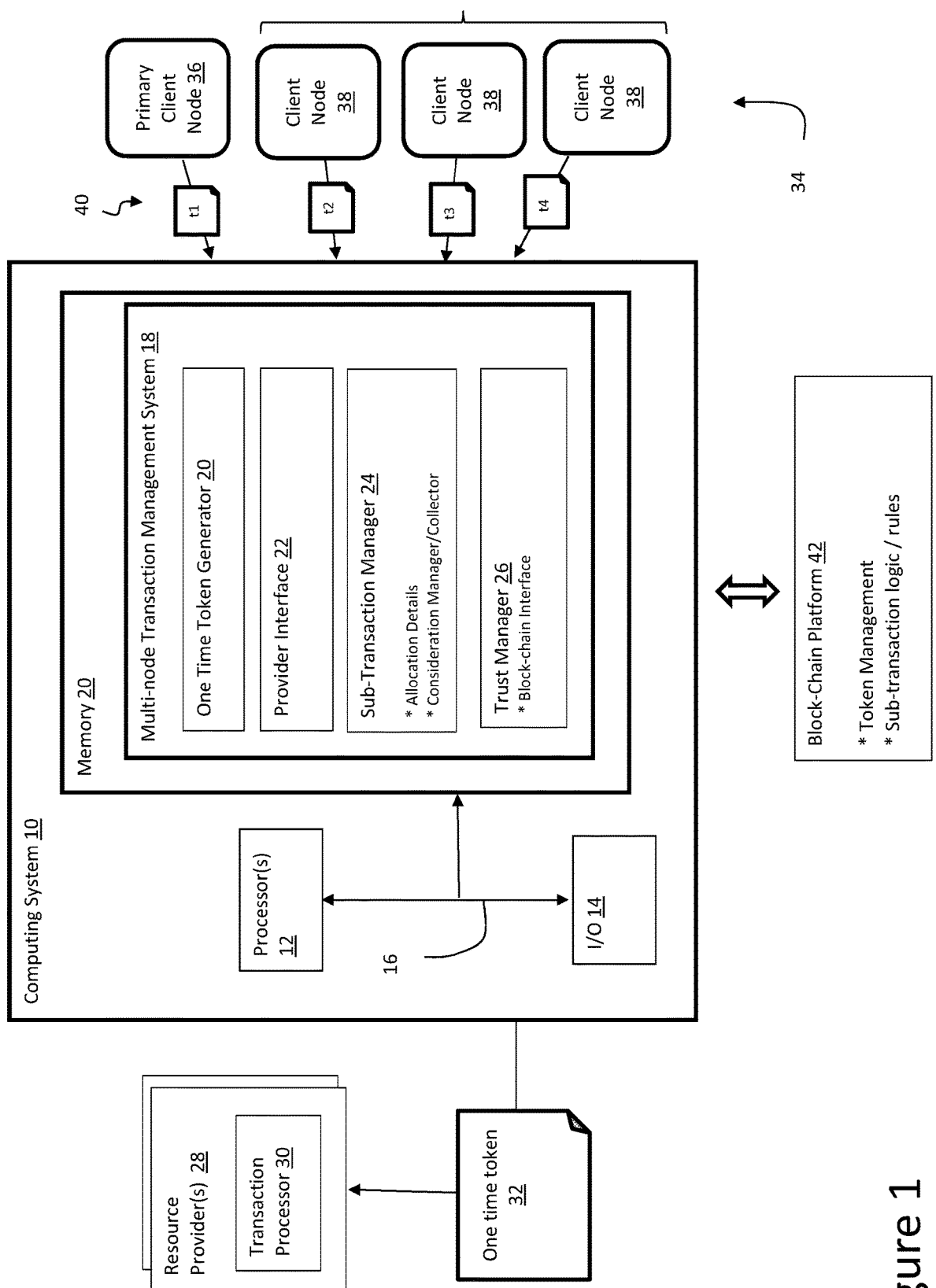
FIG. 1 shows a computing system having a multi-node transaction system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a multi-node transaction management system 18 for managing a transaction between a set of client nodes 34 and a resource provider 28. Resource provider 28 may comprise any platform capable of enabling the provisioning of resources to client nodes 34 including, e.g., provisioning of computing resources, providing autonomous services, provisioning IoT agents, allocating energy resources, provisioning of goods and services, etc. In some instances, resource provider 28 may act as a third party that provides transaction processing or other intermediary services on behalf of other resource providers. Client nodes 34 may comprise any device, application, system, platform, smart device, database, account, entity, etc., that utilizes resources of, or otherwise interacts with, resource provider(s) 28. Client nodes 34 may likewise act as intermediaries to provide transaction processing or other services on behalf of others.

In typical instances, the provisioning of resources to client nodes 34 entails an obligation on the client nodes 34, e.g., to provide recompense involving some type of consideration to the resource provider 28, which is provided in the form of a token. Tokens may include, e.g., computing agents to perform a return service, logic to guarantee a payment, logic involving a future obligation, data, etc. For example, in a case where a network platform provides data storage resources to an IoT device, the IoT device may be obligated to provide usage details back to the network platform. In other cases, the client nodes 34 may simply be obligated to compensate the resource provider 28 a predetermined amount of virtual currency in exchange for receiving something of value. Regardless, any consideration owed to the resource provider 28 is handled using tokens, which effectuates or guarantees the consideration based on existing agreements or terms of use. A transaction processor 30 associated with the resource provider 28 may be implemented to accept and process tokens, e.g., based on an existing arrangement, to fulfill the outstanding obligation, etc. Tokens may comprise any mechanism capable of representing value, e.g., a software agent, a crypto-currency, a cryptographic key, an electronic coupon, a virtual promissory note, an account ID, etc.

As noted, resource providers 28 are often not equipped to handle a transaction that involves multiple client nodes 34, and therefore multiple client tokens. For example, assume client nodes 34 wish to pool together to obtain a resource from resource provider 28, but the resource provider 28 is not capable processing multiple client tokens for a unique transaction.

To address this, the multi-node transaction management system 18 is provided and sits between the set of client nodes 34 and resource provider 28. Multi-node transaction management system 18 provides a one-time token generator 20 that generates a unique one-time token 32 when a multi-node transaction is required by multiple client nodes 34. The one-time token 32 is forwarded to the resource provider 28 via a provider interface 22 once the one-time token 32 is "secured," i.e., verified to guarantee and complete the transaction in an agreed-upon manner.

In one illustrative embodiment, the one-time token 32 is secured with a client token (i.e., t1) obtained using a sub-transaction from a primary client node 36, which requested the multi-node transaction. The token of the primary client node 36 is in turn secured with tokens from the non-primary client nodes 38 (i.e., t2 . . . t4). Alternatively, the one-time token 32 may be secured by tokens of more than one client node. Utilizing a first token to secure a second token may be implemented in any manner. For example, legal ownership of the first token may be assigned to the second token, logic may be provided to extract and transfer some value from a first token to a second, etc.

In operation, a sub-transaction manager 24 first sets an allocation among the client nodes 38 based on information received from the primary client node 36, or from some other rule or source. The allocation determines a share of the overall obligation each client node is responsible for to complete the transaction. Once the allocations are determined, sub-transaction manager 24 manages/collects the appropriate consideration from each individual client node 34, i.e., by collecting and processing individual client tokens 40 (t1 . . . t4). In one illustrative embodiment, the primary client node 36 is required to provide a token that can secure the entire transaction, while the non-primary client nodes 38 need only provide tokens that can secure their allocated share.

In one illustrative embodiment, the forwarding of the one-time token 32 to the resource provider 28 and the processing each of the sub-transactions involving client tokens 40 preferably occurs substantially contemporaneously to ensure that the one-time token 32 and primary client token (t1) are fully secured. A trust manager 26 may be implemented to verify and guarantee each of the sub-transactions and in one embodiment, trust manager 26 may utilize a block-chain platform 42. Block-chain platform 42 provides an infrastructure for managing tokens and sub-transaction logic. For example, block-chain logic/rules may be employed to ensure: (1) an appropriate transfer of block-chain tokens for each non-primary client node 38 are automatically made into a block-chain token of the primary client node 36; and (2) a simultaneous transfer is made from the block-chain token of the primary client node 36 into the one-time token 32. The trust manager 26 can thus perform necessary audits of the block-chain to ensure each of the client nodes 34 has the capability provide a token that can meet its obligation and automatically effectuate a transfer.

In operation, the process begins with a primary client node 36 requesting a multi-node transaction in response to a resource being provisioned to the set of client nodes 34. The request may for example include an allocation among the client nodes, as well as identification of each client node. A one-time token 32 is generated and the sub-transaction manager 24 collects client tokens (of the allocated amounts) from each client node 34. In one illustrative embodiment, the one-time token 32 is secured by the token of the primary client node 36, which is then made whole by tokens from the other client nodes 38. Alternatively, the one-time token 32 may be secured by some or all of the client tokens collectively.

Figure 2:
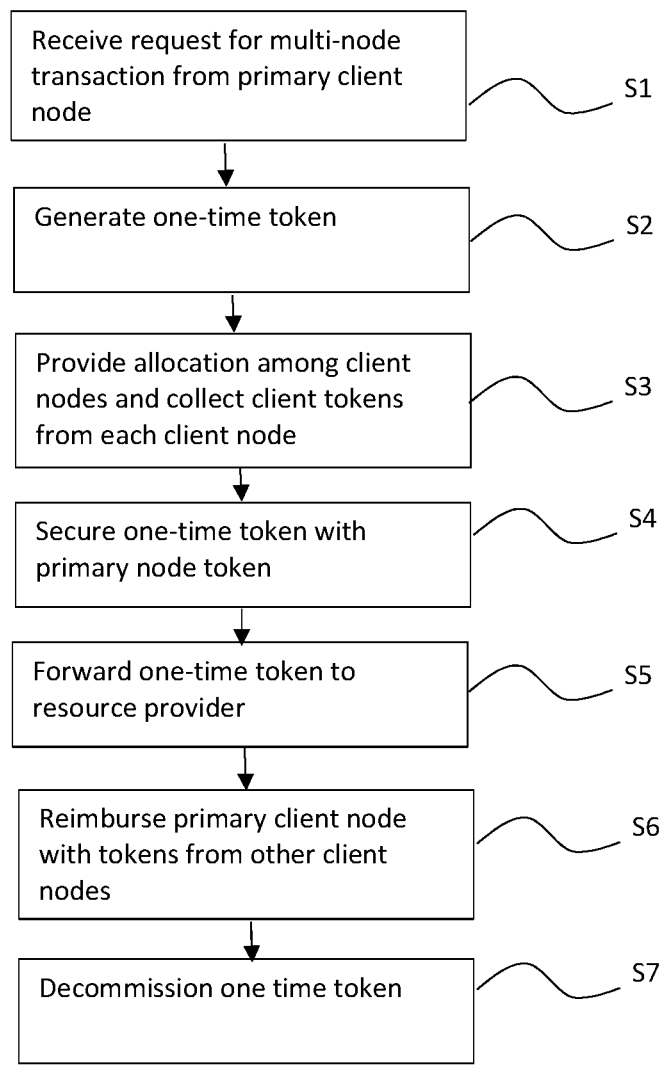
FIG. 2 shows a flow diagram for implementing a multi-node transaction according to embodiments.

FIG. 2 depicts a flow diagram of an illustrative implementation of multi-node transaction system 18. At S1, a request is received for a multi-node transaction from a primary client node 36, and at S2 a one-time token is generated. At S3, an allocation among the client nodes 34 participating in the transaction is provided. For example, all client nodes 34 may share equally in their obligation to a resource provider 28, their obligations may be based on an agreed upon arrangement, based on use, etc. Regardless, based on the allocation, tokens are requested/collected from each of the non-primary nodes 38. At S4, the one-time token 32 is fully secured with a token from the primary client node 36 and at S5, the one-time token 32 is forwarded to the resource provider 28 to satisfy the obligation accrued by the set of client nodes 34. At S6, the primary client node 36 is reimbursed with tokens from the non-primary client nodes 38 for their allocated obligations. Finally, at S7, the one-time token is decommissioned.

As noted, multi-party transaction system 18 may be utilized with any type of resource provider 28 that cannot process multiple client tokens for a shared transaction. For example, in the case where a group of IoT devices pool together to obtain data storage from a cloud platform in exchange for a predetermined amount of virtual currency, multi-node transaction system 18 may be utilized as follows. Firstly, a primary IoT device enters into an arrangement with other IoT devices to obtain shared data storage and then requests a multi-node transaction from a provider. An allocation and identity of the participating IoT devices is provided to the system 18. The system 18 then generates a one-time token 32, which for example is secured in full by an account of the primary IoT device (that holds enough virtual currency). A series of sub-transactions are entered into with the non-primary IoT devices to collect their share of the obligation. Each of the non-primary IoT devices forwards a token to the system 18 which is used to reimburse the primary IoT device and the one-time token 32 is forwarded to the resource provider 28 to complete the transaction. The one-time token 32 is then decommissioned.

In another example, system 18 may be utilized to allocate credit card payments amongst a set of credit card accounts. In this case, an App associated with a primary card holder is used to request a multi-node transaction to pay a provider for a shared purchase. An allocation amongst the card holders, as well as the credit card information of each card holder, is forwarded to the system 18. A one-time account for a set amount (i.e., a one-time token) is created by the system 18 and is secured by the credit card account (i.e., the primary client token) of the primary card holder. The primary credit card account is automatically charged for the entire obligation when the one-time account is charged by the provider. At the same time, the primary card account is automatically reimbursed from the non-primary card holder accounts (i.e., non-primary client tokens), and the one-time account is closed.

It is understood that multi-node transaction system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the multi-node transaction system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A multi-node transaction management system, comprising:
    a memory; and
    a processor communicatively coupled to the memory, wherein the processor is configured to perform a method comprising:
        generating a one-time token in response to a request for a multi-node transaction with a resource provider for a group of client nodes located remotely from the multi-node transaction management system, wherein the group of client nodes includes a primary client node and one or more non-primary client nodes, wherein the one-time token is a one-time account created for a set amount, and wherein the set amount is an entire obligation of the multi-node transaction;
        collecting tokens from each client node involved in the multi-node transaction, wherein at least one of the tokens is utilized to fully secure the one-time token;
        providing a trust manager configured to ensure that each client node meets an allocated obligation of the multi-node transaction;
        securing the one-time account using a primary account of the primary client node by automatically charging the set amount to the primary account in response to the resource provider charging the one-time account;
        forwarding the one-time token to the resource provider to complete the multi-node transaction,
        automatically reimbursing, at the same time that the primary account is charged, the primary account from the non-primary accounts associated with the non-primary client nodes; and
        closing the one-time account.

2. The multi-node transaction management system of claim 1, wherein the request is received from the primary client node and includes an allocation and identity of the one or more non-primary client nodes.

3. The multi-node transaction management system of claim 1, wherein the resource provider is selected from a group consisting of: a cloud infrastructure, a network infrastructure, an IoT (Internet of Things) platform, an autonomous vehicle platform, or a credit processing platform.

4. The multi-node transaction management system of claim 1, wherein each client node is selected from a group consisting of: a device, an application, a system, a platform, a smart device, a financial account, or an entity.

5. The multi-node transaction management system of claim 1, wherein each token includes at least one of: a software agent, a crypto-currency, a cryptographic key, an electronic coupon, a virtual promissory note, data, or an account identifier.

6. A method of providing multi-node transaction management, comprising:
    remotely receiving a request for a multi-node transaction with a resource provider for a group of client nodes, wherein the group of client nodes includes a primary client node and one or more non-primary client nodes;
    generating a one-time token in response to the request at a location remote from the client nodes, wherein the one-time token is a one-time account created for a set amount, and wherein the set amount is an entire obligation of the multi-node transaction;
    collecting tokens from each client node involved in the multi-node transaction, wherein at least one of the tokens is utilized to fully secure the one-time token;
    providing a trust manager that ensures that each client node meets an allocated obligation of the multi-node transaction;
    securing the one-time account using a primary account of the primary client node by automatically charging the set amount to the primary account in response to the resource provider charging the one-time account;
    forwarding the one-time token to the resource provider to complete the multi-node transaction;
    automatically reimbursing, at the same time the primary account is charged, the primary account from the non-primary accounts associated with the non-primary client nodes; and closing the one-time account.

7. The method of claim 6, wherein the request is received from the primary client node and includes an allocation and identity of the one or more non-primary client nodes.

8. The method of claim 7, wherein the token collected from the primary client node is utilized to fully secure the one-time token.

9. The method of claim 8, wherein the tokens collected from each non-primary client node are utilized to secure the token collected from the primary client node.

10. The method of claim 6, wherein the trust manager interfaces with a block-chain platform that manages token data for each of the client nodes.

11. The method of claim 6, wherein:
the resource provider is selected from a group consisting of: a cloud infrastructure, a network infrastructure, an IoT (Internet of Things) platform, an autonomous vehicle platform, or a credit processing platform; and
each client node is selected from a group consisting of: a device, an application, a system, a platform, a smart device, a financial account, or an entity.

12. A computer program product stored on a computer readable storage medium, which when executed by a computing system, provides multi-node transaction management, the program product comprising program code that:
receives a request for a multi-node transaction with a resource provider for a group of client nodes, wherein the group of client nodes includes a primary client node and one or more non-primary client nodes;
generates a one-time token in response to the request at a location remote from the client nodes, wherein the one-time token is a one-time account created for a set amount, and wherein the set amount is an entire obligation of the multi-node transaction;
collects tokens from each client node involved in the multi-node transaction, wherein at least one of the tokens is utilized to fully secure the one-time token;
provides a trust manager that ensures that each client node meets an allocated obligation of the multi-node transaction;
secures the one-time account using a primary account of the primary client node by automatically charging the set amount to the primary account in response to the resource provider charging the one-time account;
forwards the one-time token to the resource provider to complete the multi-node transaction;
automatically reimburses, at the same time that the primary account is charged, the primary account from non-primary accounts associated with the non-primary client nodes; and
closes the one-time account.

13. The program product of claim 12, wherein the request is received from the primary client node and includes an allocation of the set amount and an identity for each non-primary client node of the one or more non-primary client nodes.

14. The program product of claim 13, wherein the token collected from the primary client node is utilized to fully secure the one-time token.

15. The program product of claim 14, wherein the tokens collected from each non-primary client node are utilized to secure the token collected from the primary client node.

16. The program product of claim 12, wherein the trust manager interfaces with a block-chain platform that manages token data for each of the client nodes.

17. The program product of claim 12, wherein:
the resource provider is selected from a group consisting of: a cloud infrastructure, a network infrastructure, an IoT (Internet of Things) platform, an autonomous vehicle platform, or a credit processing platform;
each client node is selected from a group consisting of: a device, an application, a system, a platform, a smart device, a financial account, or an entity; and
each token includes at least one of: a software agent, a crypto-currency, a cryptographic key, an electronic coupon, a virtual promissory note, or an account identifier.

* * * * *